United States Patent [19]
Inoue et al.

[11] Patent Number: 6,037,567
[45] Date of Patent: Mar. 14, 2000

[54] VEHICLE AIR-CONDITIONING SYSTEM WITH HEAT EXCHANGER HAVING INTEGRATED ELECTRIC HEATERS AND TEMPERATURE CONTROL SYSTEM

[75] Inventors: Yoshimitsu Inoue, Chiryu; Koji Takahashi; Hajime Ito, both of Kariya, all of Japan

[73] Assignee: Denso Corporation, Kariya, Japan

[21] Appl. No.: 09/235,182

[22] Filed: Jan. 22, 1999

[30] Foreign Application Priority Data

Feb. 9, 1998 [JP] Japan ................................. 10-27329

[51] Int. Cl.[7] .................................................. B60H 1/22
[52] U.S. Cl. .......................... 219/202; 219/505; 392/495; 392/496; 165/299; 165/300; 165/41; 237/12.3 B; 236/37
[58] Field of Search ..................................... 219/202, 208, 219/505; 392/495, 496, 482; 165/299, 300, 41, 172, 173–176, 151, 148, 149, 143; 237/12.3 R, 12.3 A, 12.3 B; 236/37, 38, 11

[56] References Cited

U.S. PATENT DOCUMENTS

| | | | |
|---|---|---|---|
| 1,863,882 | 6/1932 | Scharf | 219/202 |
| 2,019,991 | 11/1935 | Nilson | 165/41 |
| 3,658,244 | 4/1972 | Caldwell | 236/37 |
| 4,700,888 | 10/1987 | Samulak | 219/202 |
| 5,606,641 | 2/1997 | Bucaille | 392/495 |

FOREIGN PATENT DOCUMENTS

| | | | |
|---|---|---|---|
| 1305867 | 4/1962 | France | 219/202 |
| 2236152 | 2/1974 | Germany | 219/202 |
| 44 33 814 | 3/1996 | Germany . | |

*Primary Examiner*—John A. Jeffery
*Attorney, Agent, or Firm*—Harness, Dickey & Pierce, PLC

[57] ABSTRACT

A vehicle air-conditioning system includes electric heating devices to accelerate a rise in temperature of air for heating a passenger compartment by accelerating a rise in temperature of warm water used to heat the air and by directly heating the air. Electric heating devices are built into a heat exchanger for heating so that the devices can release heat into surrounding air through radiating fins. When the system is in a heating operation region and the temperature of warm water available to flow through the heat exchanger is below a set temperature $T_2$, the electric heating devices are turned on. A blower for blowing heating air into a passenger compartment through the heat exchanger is stopped, and a warm water valve is opened to allow the warm water to flow through the heat exchanger, whereupon heat from the electric heating devices is released through the radiating fins into the warm water inside the heat exchanger. When the temperature of the warm water rises above the set temperature $T_2$, the blower is started, and heat from the electric heating devices is released through the radiating fins into the air blown by the blower.

10 Claims, 5 Drawing Sheets

VEHICLE AIR-CONDITIONING SYSTEM WITH HEAT EXCHANGER HAVING INTEGRATED ELECTRIC HEATERS AND TEMPERATURE CONTROL SYSTEM

CROSS-REFERENCE TO RELATED APPLICATION

The present application is related to, and claims priority from, Japanese Patent Application No. Hei-10-27329, the contents of which are incorporated herein by reference.

BACKGROUND OF THE INVENTION

1. Field of the Invention

The present invention relates generally to vehicle air-conditioning systems, and more particularly to a system with electric heating devices integrated into the system heat exchanger as an auxiliary heat source for more rapidly heating engine cooling water used to heat a passenger compartment.

2. Description of Related Art

In recent years, as vehicle engines have become more efficient, there has been a tendency for the temperature of warmed vehicle engine cooling water to remain at a lower temperature than in the past, even after the engine has warmed up. Consequently, in warm water type air-conditioning systems for heating the inside of a passenger compartment, insufficient heating capacity has been become a problem.

German Patent Application No. 4433814A1 discloses a system wherein electric heating devices are mounted between pairs of warm water tubes, or between water tubes and radiating fins, in a warm water type heat exchanger. Heat produced by the heating devices is used to heat warm water inside the tubes.

However, in the above system, because the electric heating devices are mounted in direct contact with the warm water tubes, and heat from the electric heating devices is directly conducted to the warm water inside the tubes, the amount of heat transferred from the electric heating devices to the heating air is minimal, and the proportion of the air heated by the electric heating devices is low.

SUMMARY OF THE INVENTION

It is therefore an object of the present invention to provide a vehicle air-conditioning system wherein electric heating devices are used to accelerate a rise in the temperature of air for heating a passenger compartment, by accelerating the rise in temperature of warm water used to heat the air, and by directly heating the air.

To achieve the above-mentioned object and other objects, the present invention has been proposed based on the following.

In vehicle air-conditioning systems having a heat exchanger utilizing a warm water heat source, as is known, so-called warm-up control is utilized. In this warm-up control, when heating of the passenger compartment is started immediately following vehicle engine startup, i.e. when the engine cooling water temperature is low, even if a passenger initiates such heating, the blower is prevented from operating until the warm water temperature rises to a predetermined temperature (for example 35° C.), whereupon the blower is started at a low speed. Thereafter the blower speed is gradually increased as the water temperature rises.

By means of this warm-up control, the uncomfortable phenomenon of cold air being blown out into the passenger compartment during initial heating is prevented.

The present invention provides a system wherein the electric heating device is disposed between two adjacent radiating fins so that the radiating fins are interposed between the electric heating device and the warm water tubes of the heat-exchanger core.

With the above heat exchanger, because heat from the electric heating device is first conducted to the radiating fins, the heat from the electric heating device is released through the fins into the surrounding air prior to being released into the warm water inside the tubes.

Even with the above kind of construction, during the above-mentioned warm-up control, because the flow of heating air is stopped, heat from the radiating fins almost ceases to be released into the air. Therefore, it is possible for heat from the electric heating device to be effectively released through the radiating fins into the water inside the tubes.

In view of the above, the present invention provides a vehicle air-conditioning system in which, when the warm water is at a low temperature immediately after engine startup, the above-mentioned warm-up control is utilized to effectively increase the water temperature with heat from an electric heating device. When on the other hand the warm water temperature has risen to a predetermined temperature and the system blower has started, the heating air temperature delivered by the blower can be effectively increased by heat from the electric heating device through radiating fins.

DETAILED DESCRIPTION OF THE PREFERRED EMBODIMENTS

Preferred embodiments of the invention will now be described on the basis of the accompanying drawings.

(First Preferred Embodiment)

Figure 1:
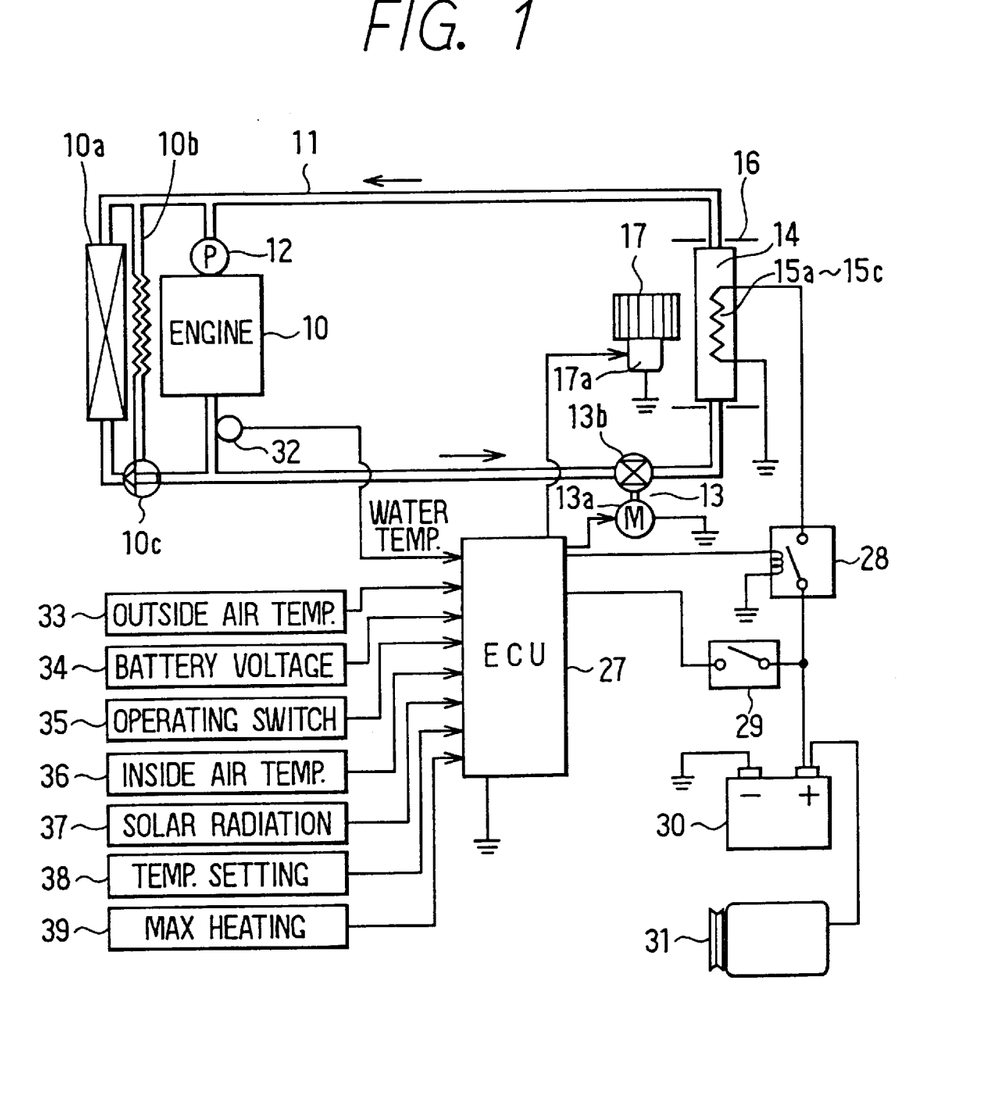
FIG. 1 is an overall system view of a vehicle air-conditioning system according to a preferred embodiment of the present invention, including an electrical control system and a warm water circuit including a heat exchanger for heating.

FIG. 1 shows a vehicle warm water circuit including a warm water type heat exchanger for vehicle interior heating having integral electric heating devices. In FIG. 1, a warm water circuit 11 of a water-cooled vehicle engine 10 has a warm water pump 12 driven by the vehicle engine 10, and the warm water pump 12 circulates engine cooling water around the warm water circuit 11.

Figure 2:
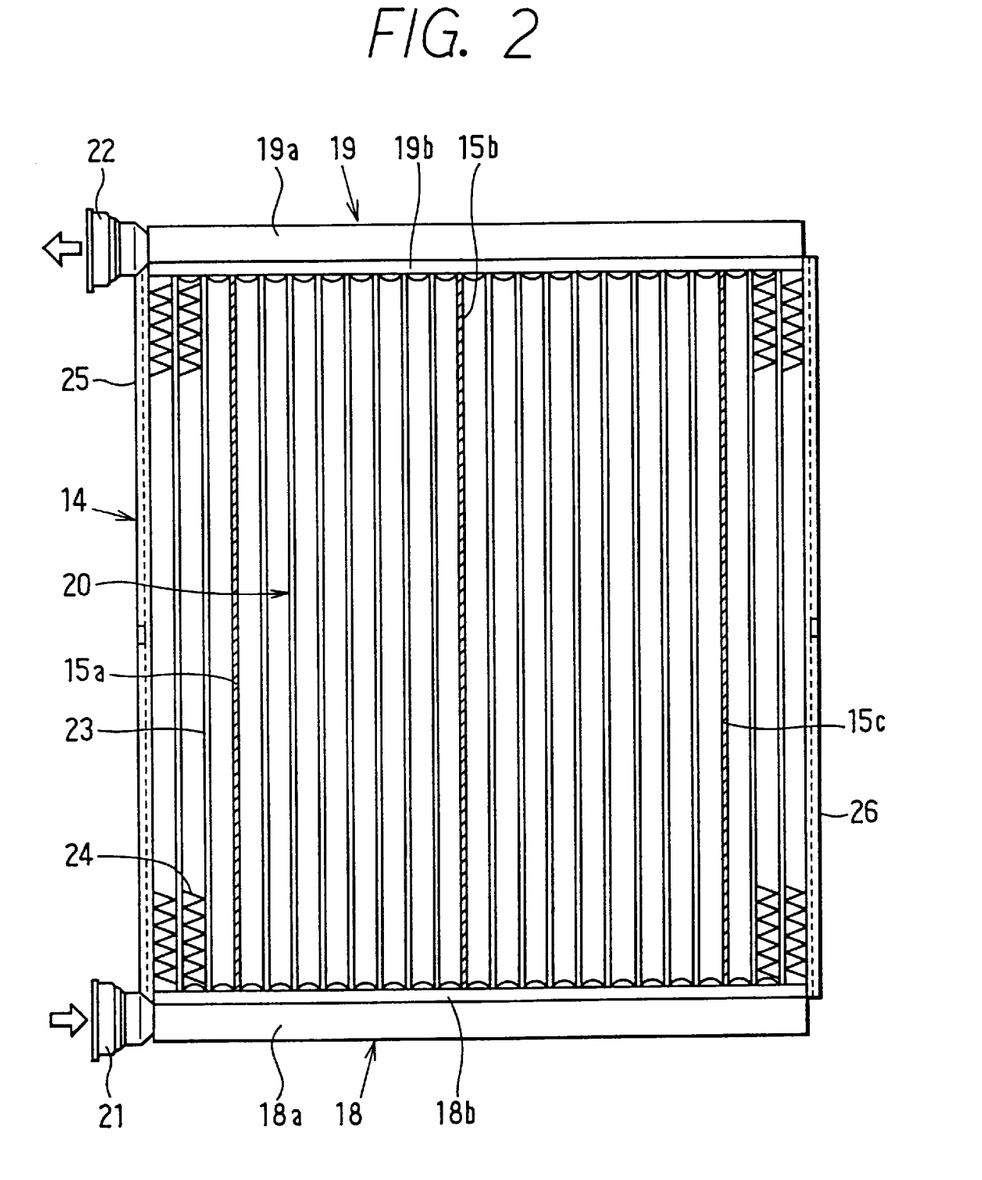
FIG. 2 is a front view of the heat exchanger for heating shown in FIG. 1.

In the warm water circuit 11, warm water heated by the vehicle engine 10 flows into a heat exchanger for vehicle interior heating 14 through a warm water valve 13. Here, the warm water valve 13 is made up of an electric actuator 13a such as a servo motor and a valve 13b operated by this electric actuator 13a to adjust the aperture to the flow passage of the warm water. As shown in FIG. 2, a plurality of electric heating devices, for example three electric heating devices 15a through 15c, are integrally built into the heat exchanger 14, and the heat exchanger 14 is housed in a case 16 forming a ventilation flue of a vehicle air-conditioning system.

The heat exchanger 14 heats air blown through it by an air-conditioning blower 17, using warm water or the electric heating devices 15a through 15c as a heat source. In FIG. 1, the reference numeral 10a denotes a radiator for cooling engine cooling water; 10b a bypass passage; and 10c a thermostat which opens a passage to the radiator 10a when the temperature of the engine cooling water rises above a predetermined temperature.

FIG. 2 is a front view of the heat exchanger for vehicle heating 14 shown in FIG. 1. This heat exchanger 14 has a warm water inlet side tank 18, a warm water outlet side tank 19, and a heat-exchanging core part 20 disposed between these two tanks 18 and 19.

An inlet pipe 21 through which warm engine cooling water from the vehicle engine 10 flows in is provided on the warm water inlet side tank 18, and an outlet pipe 22 through which warm water flows out and is returned to the engine 10 side is provided on the warm water outlet side tank 19. The heat exchanger 14 of the present embodiment is top-bottom symmetrical, as shown in FIG. 2, and therefore the positions of the warm water inlet side tank 18 and the warm water outlet side tank 19 may be reversed.

The tanks 18, 19 are respectively made up of tanks proper 18a, 19a and metal sheets 18b, 19b closing open faces of the tanks proper 18a and 19a, and are known tank constructions having a left-right lengthwise direction as shown in FIG. 2. Multiple flat tube insertion holes (not shown) are formed in each of the metal sheets 18b, 19b in a line or a plurality of lines in the left-right direction of FIG. 2.

The heat-exchanging core part 20 has multiple flat-shaped warm water tubes 23, each being parallel with the flow direction of heating air (the direction perpendicular to the sheet of FIG. 2), disposed in a row in the left-right direction of FIG. 2. Warm water flows through the insides of the multiple warm water tubes 23 from the lower side to the upper side of FIG. 2. Corrugated radiating fins 24 are disposed between and joined to the warm water tubes 23. Multiple louvers (not shown) are punch-formed diagonally at a predetermined angle with respect to the flow direction of the heating air in a known fashion in each of the radiating fins 24 to improve the heat transfer efficiency of the fins.

The ends of the warm water tubes 23 are inserted into and joined to the tube insertion holes of the metal sheets 18b, 19b. Side plates 25, 26 are disposed on the outer sides of the outermost radiating fins 24 (at the left and right ends of FIG. 2) of the core part 20, and the side plates 25, 26 are joined to the outermost radiating fins 24 and to the tanks 18, 19.

Figure 3:
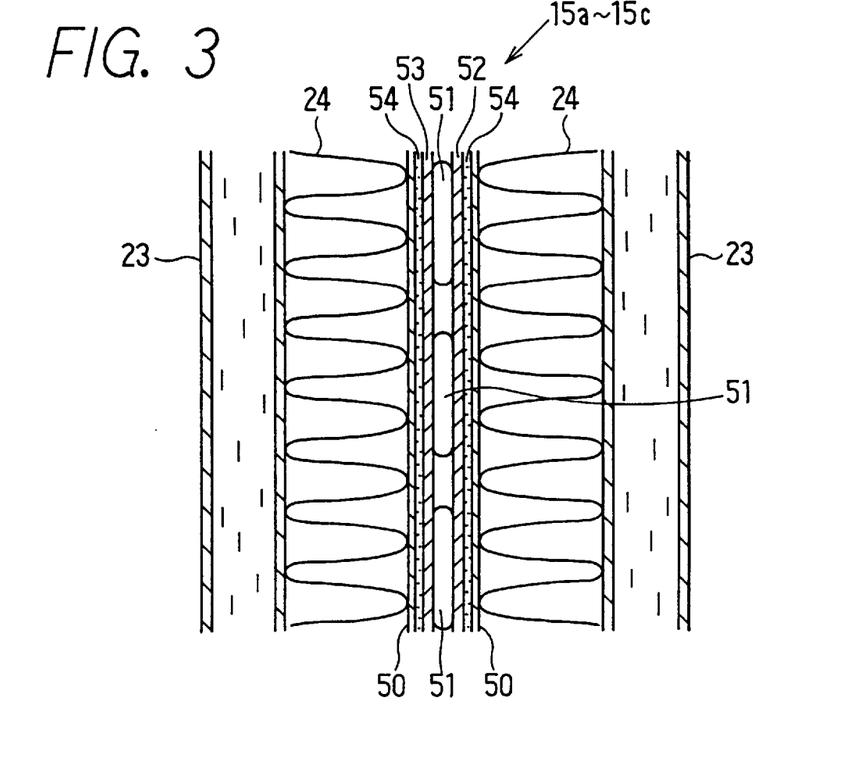
FIG. 3 is an enlarged sectional view of a part of the heat exchanger of FIG. 2 where an electric heating device is installed.

Also, in predetermined locations in the heat-exchanging core part 20, the electric heating devices 15a through 15c are fitted instead of warm water tubes 23. In the example shown in FIG. 2, the electric heating devices 15a through 15c are fitted in three equally-spaced positions in the heat-exchanging core part 20, in left-right symmetrical positions. More specifically, as shown in FIG. 3, flat metal holding plates 50, 50, each extending in the lengthwise direction of the warm water tubes 23, are joined to the ridges of the adjacent radiating fins 24 with a predetermined gap therebetween, in the parts of the heat-exchanging core part 20 where the electric heating devices 15a through 15c are fitted. The electric heating devices 15a through 15c are inserted between the metal holding plates 50, 50.

The components of the heat exchanger 14 and the metal holding plates 50, 50 are all made from aluminum and are joined together by brazing, and installation of the electric heating devices 15a through 15c is carried out after this brazing. The metal holding plates 50, 50 may be two plate members or, alternatively, may be formed from a single U-shaped plate.

As shown in FIG. 3, the electric heating devices 15a through 15c each have a 3-layer sandwich construction including a plurality of plate-like heating device elements 51 and flat electrode plates 52, 53 disposed on either side of the heating device elements 51 covered by an electric insulator 54. The heating device elements 51 are electrically connected to an outside circuit by the above-mentioned electrode plates 52, 53.

The heating device elements 51 are PTC heater elements (for example, barium titanate) made from a resistor material having a positive resistance-temperature characteristic such that its resistance increases rapidly at a predetermined set temperature (the Curie point; for example 150° C.). Because the heating device elements 51 consist of PTC heater elements of this kind, as is known, the elements each have a self temperature control capability of auto-controlling heating temperature to the Curie point. The electric heating devices 15a through 15c are electrically connected in parallel to a vehicle-mounted power source (the battery 30 shown in FIG. 1).

Referring to again to FIG. 1, an electronic control unit (ECU) 27 controls the supply of power to the electric heating devices 15a through 15c. The ECU 27 is a microcomputer that performs predetermined computation processing and controls the supply of current to the electric heating devices 15a through 15c and other devices based on control programs stored therein. Output signals of the ECU 27 are applied to relays 28, and currents to the electric heating devices 15a through 15c are switched on and off by the relays 28.

In FIG. 1, only one each of the electric heating devices 15a through 15c and the relays 28 is shown; however, actually, three relays 28 are provided, with one corresponding to each of the three electric heating devices 15a through 15c. The currents of each of the three electric heating devices 15a through 15c can be controlled independently.

Power is supplied to the ECU 27 from the vehicle battery 30 by way of an ignition switch 29 for starting and stopping the vehicle engine 10. An alternator 31 is connected to the vehicle battery 30, and the battery 30 is charged by an output voltage of the alternator 31.

Signals from the following various sensors are input into the ECU 27. That is, signals are input into the ECU 27 from a water temperature sensor 32 for detecting the warm water temperature of the water-cooled vehicle engine 10, an outside air temperature sensor 33 for detecting the outside air temperature, a battery voltage sensor 34 for generating a signal corresponding to the charge voltage of the vehicle battery 30, an air-conditioning operating switch (for example, an air-conditioning blower switch) 35, an inside air temperature sensor 36 for detecting the temperature of air inside the vehicle passenger compartment, a solar radiation sensor 37 for detecting the amount of solar radiation entering the passenger compartment, a temperature setter 38 on an air-conditioning operating panel, and a maximum heating switch 39 generating a signal indicating a state of maximum heating.

Figure 4:
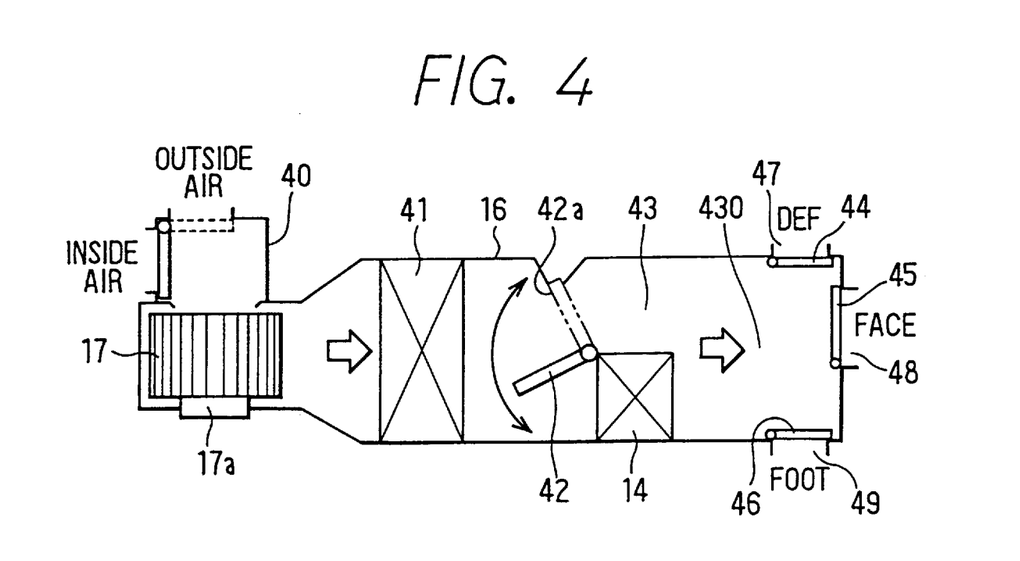
FIG. 4 is a schematic sectional view of an air-conditioning system ventilation line in the same preferred embodiment.

FIG. 4 is a schematic view of the ventilation system of the vehicle air-conditioning system. Outside air or inside air is introduced through an inside/outside air switching box 40. This introduced air is blown by the action of the blower 17 through a heat exchanger 41 and is cooled and dehumidified.

In the example shown in FIG. 4, the temperature adjustment method of the vehicle air-conditioning system is a known air mix type, and the air cooled by the heat exchanger 41 is divided by an air mix door 42 into a warm air draft that passes through the heat exchanger 14 and a cool air draft that passes through a bypass passage 43 of the heat exchanger 14.

Therefore, the temperature of the air blown into the passenger compartment can be adjusted by the flow proportions of the warm air draft and the cool air draft being adjusted via the air mix door 42. Here, the reference numeral 42a denotes a maximum heating state, wherein the air mix door 42 has completely closed the bypass passage 43 and completely opened the air path to the heat exchanger 14.

The above-mentioned maximum heating switch 39 is turned on and off according to whether or not the vehicle air-conditioning system is in the maximum heating state. For example, when the temperature adjustment method of the vehicle air-conditioning system is the air mix type described above, as shown in FIG. 4, the maximum heating switch 39 turns on when the air mix door 42 has been operated to the position 42a, shown with dashed lines in FIG. 4. In this position, it completely closes the bypass passage 43 and completely opens the air path to the heat exchanger 14.

In FIG. 4, the reference numeral 430 denotes a mixing part where the warm draft and the cool draft mix; 44 through 46 denote draft mode switching doors; 47 denotes a defrosting opening for directing air at the inside of the vehicle windshield; 48 denotes a face opening for directing air at the head of a passenger; and 49 denotes a foot opening for directing air at the feet of the passenger.

Next, the operation of the embodiment described above will be described on the basis of the flow diagram of FIG. 5. The control routine of FIG. 5 starts when the ignition switch 29 of the vehicle engine 10 and the air-conditioning operating switch 35 are both turned on. At step S100, signals from the various sensors and switches are read. Next, at step S110, a target draft air temperature TAO necessary for maintaining the inside of the passenger compartment at a target temperature is calculated. This target temperature TAO of air blown into the passenger compartment is calculated on the basis of the following Exp. 1, which is stored in a ROM associated with the ECU.

$$TAO = Kset \times Tset - Kr \times Tr - Kam \times Tam \times Ks \times Ts + C$$

Here, Tset is a target temperature set by means of the temperature setter 38 on the air-conditioning control panel, Tr is the inside air temperature detected by the inside air temperature sensor 36, Tam is the outside air temperature detected by the outside air temperature sensor 33, and Ts is the amount of solar radiation detected by the solar radiation sensor 37. Kset, Kr, Kam and Ks are gains, and C is a correction constant.

Next, at step S120, it is determined whether the target draft air temperature TAO is equal to or greater than a set value (for example 35° C.). This is to determine whether or not the operating state of the air-conditioning system is in a heating operation region.

When at step S120 TAO is above the set value and the operating state is determined to be in the heating operation region, at the following step S130 it is determined on the basis of the signal from the maximum heating switch 39 whether or not the system is in the maximum heating state.

If the system is in the maximum heating state, at step S140 it is determined on the basis of the signal from the battery voltage sensor 34 whether or not the battery is amply charged. If the battery is amply charged, at step S150 it is determined on the basis of the signal from the outside air temperature sensor 33 whether or not the outside air temperature is below a predetermined temperature (for example 10° C.).

Because this is to determine whether or not the environment of the vehicle is presently cold, in which case it will take time for the warm water temperature to rise, the set temperature is set at a rather low temperature of, for example, 10° C. Then, if the outside air temperature is below 10° C., at step S160 it is determined on the basis of the signal from the water temperature sensor 32 whether or not the water temperature is equal to or below a first set temperature $T_1$ (for example 80° C.). If the water temperature is equal to or below 80° C., at step S170 the relays 28 are turned on, and currents are passed through the electric heating devices 15a through 15c.

Then, at step S180, water temperature is again determined. That is, it is determined whether or not the water temperature is equal to or below a second set temperature $T_2$ (for example 35° C.). Here, the second set temperature $T_2$ is a minimum temperature at which the warm water can heat air to a comfortable heating temperature, such as, for example, about 35° C. If the water temperature is equal to or below 35° C., at step S190 the air-conditioning blower 17 is stopped and the warm water valve 13 is opened.

As a result of the warm water valve 13 being opened with the air-conditioning blower 17 stopped and currents being passed through the electric heating devices 15a through 15c, the following action occurs in the heat exchanger 14.

In the warm water circuit 11, due to the operation of the warm water pump 12 driven by the vehicle engine 10, warm water passes from the engine 10 through the warm water valve 13 and flows through the inlet pipe 21 into the warm water inlet side tank 18 of the heat exchanger 14.

The warm water is then distributed by the warm water inlet side tank 18 into the multiple warm water tubes 23 and passes through the tubes 23. The water then flows into the warm water outlet side tank 19 to outside the heat exchanger through the outlet pipe 22, and returns to the engine side. At this time, because no air is being blown through the gaps between the warm water tubes 23 and the radiating fins 24, no heat is released into the air.

As a result, when currents are passed through the electric heating devices 15a through 15c, and the heating devices consequently give off heat, the heat produced by the electric heating devices 15a through 15c is not substantially released into the air through the radiating fins 24, but rather is conducted into the warm water inside the warm water tubes 23 to heat the water. Thus the water can be heated by the heating of the electric heating devices 15a through 15c.

Here, because the electric heating devices 15a through 15c release heat into the water at a low temperature, the temperature of the electric heating devices 15a through 15c is maintained at a temperature lower than the Curie point. Consequently, the electric resistance of the electric heating devices 15a through 15c is kept to a relatively low value, and the current (i.e. the power consumption) of the electric heating devices 15a through 15c is relatively large. As a result, the generating load on the alternator 31 and the driving load on the vehicle engine 10 both increase, and the amount of waste heat produced by the engine 10 itself increases.

Consequently, the increased waste heat from the engine 10 and heat transfer from the electric heating devices 15a through 15c combine to rapidly raise the water temperature.

Then, when the warm water temperature rises above the second set temperature $T_2$ (for example 35° C.), processing proceeds from step S180 to step S200 and the air-conditioning blower 17 is operated, and the warm water valve 13 is opened. As a result of the operation of the air-conditioning blower 17, air passes through the gaps between the warm water tubes 23 and the radiating fins 24 of the heat exchanger 14.

Because heat produced by the electric heating devices 15a through 15c is conducted to the radiating fins 24 on both sides of the respective heating devices and is released from the radiating fins 24 into the air for heating, the amount of heat conducted from the electric heating devices 15a through 15c to the warm water inside the warm water tubes 23 decreases. Therefore, the air for heating can be rapidly heated by heat produced by the electric heating devices 15a through 15c, and immediately effective heating can thereby be performed.

It should be noted that, due to the start of the blower, the amount of heat removed from the electric heating devices (the PTC elements) 15a through 15c increases and the temperatures of the electric heating devices 15a through 15c decrease. In accordance with the PTC resistance-temperature characteristic, the resistances of the heating devices decrease and the currents passing through the heating devices increase (see FIG. 6).

Figure 6:
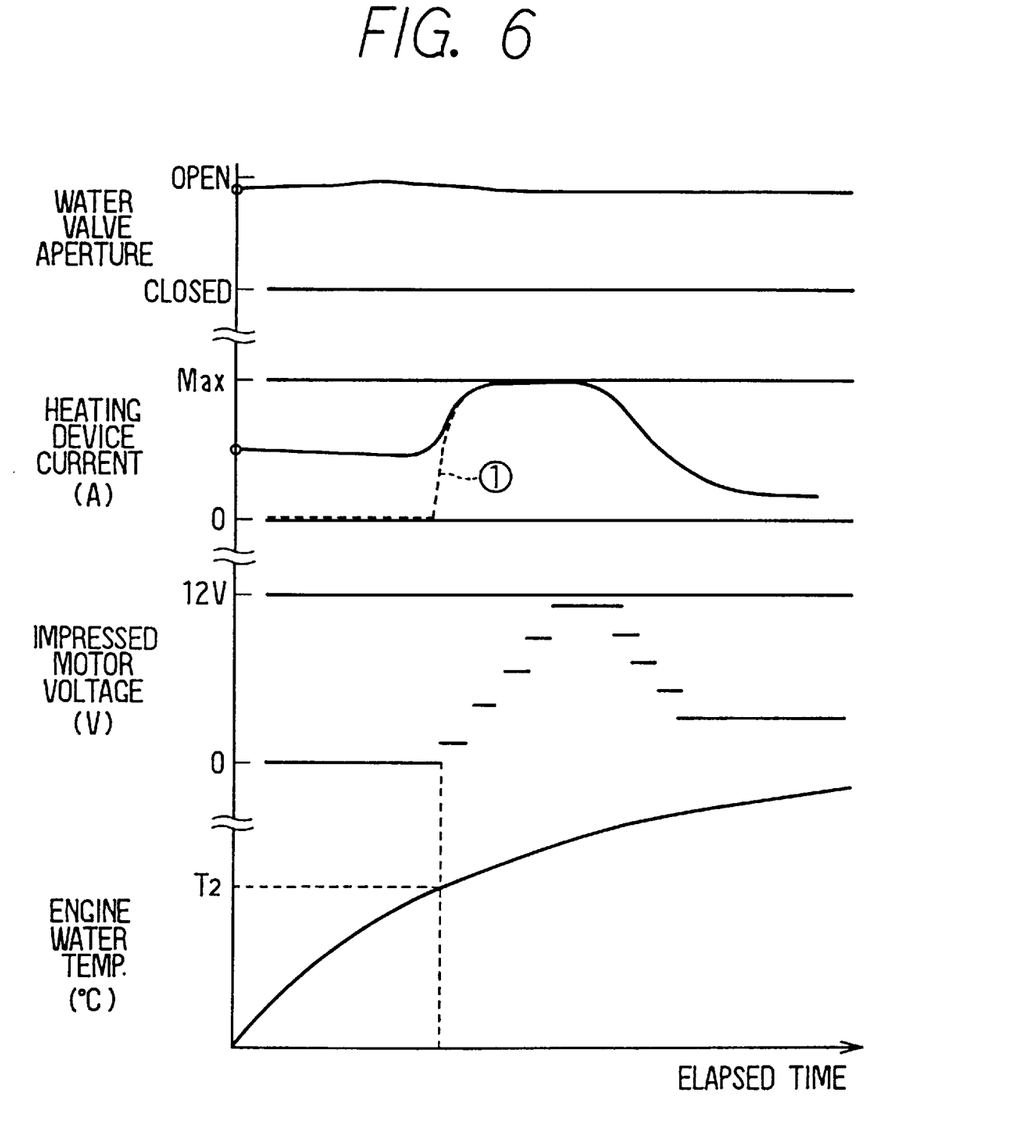
FIG. 6 is a diagram illustrating the operation of the preferred embodiment.

Also, at this time, if the flow of air for heating suddenly rises, the temperature of air supplied to the inside of the passenger compartment falls and causes the heating feeling to deteriorate. As shown in FIG. 6, the voltage impressed on the blower motor 17a is minimal at the time the air-conditioning blower 17 is started, and thereafter is raised gradually in correspondence with the rising of the warm water temperature. Therefore, because the flow of air for heating increases gradually after the warm water temperature has risen above the second set temperature $T_2$, the temperature of the air delivered to the inside of the passenger compartment does not decrease, and a comfortable heating feeling can be quickly obtained.

In FIG. 6, the horizontal axis represents elapsed time after the air-conditioning operating switch 35 is turned on, and the vertical axis represents the aperture of the warm water valve 13, the current passing through the electric heating devices 15a through 15c, the voltage impressed on the motor driving the air-conditioning blower 17, and the engine water temperature.

The dashed line [1] in the graph of current of the electric heating devices 15a through 15c is the current when the warm water temperature is less than the second set temperature $T_2$ (for example 35° C.). In such a case, a current is simply passed through the electric heating devices 15a through 15c without the devices releasing heat either into the air or into the warm water. This comparison example shown by the dashed line [1] illustrates how, because the amount of heat removed from the electric heating devices 15a through 15c is very small, the temperature of the electric heating devices 15a through 15c soon reaches the Curie point and the electric resistance of the devices rapidly rises and the current passing through the devices rapidly falls. Also, because the generating load on the alternator 31 is small, the driving load on the vehicle engine 10 does not increase. Consequently, the amount of waste heat produced by the engine 10 itself does not increase, and the water temperature is minimally heated.

Figure 5:
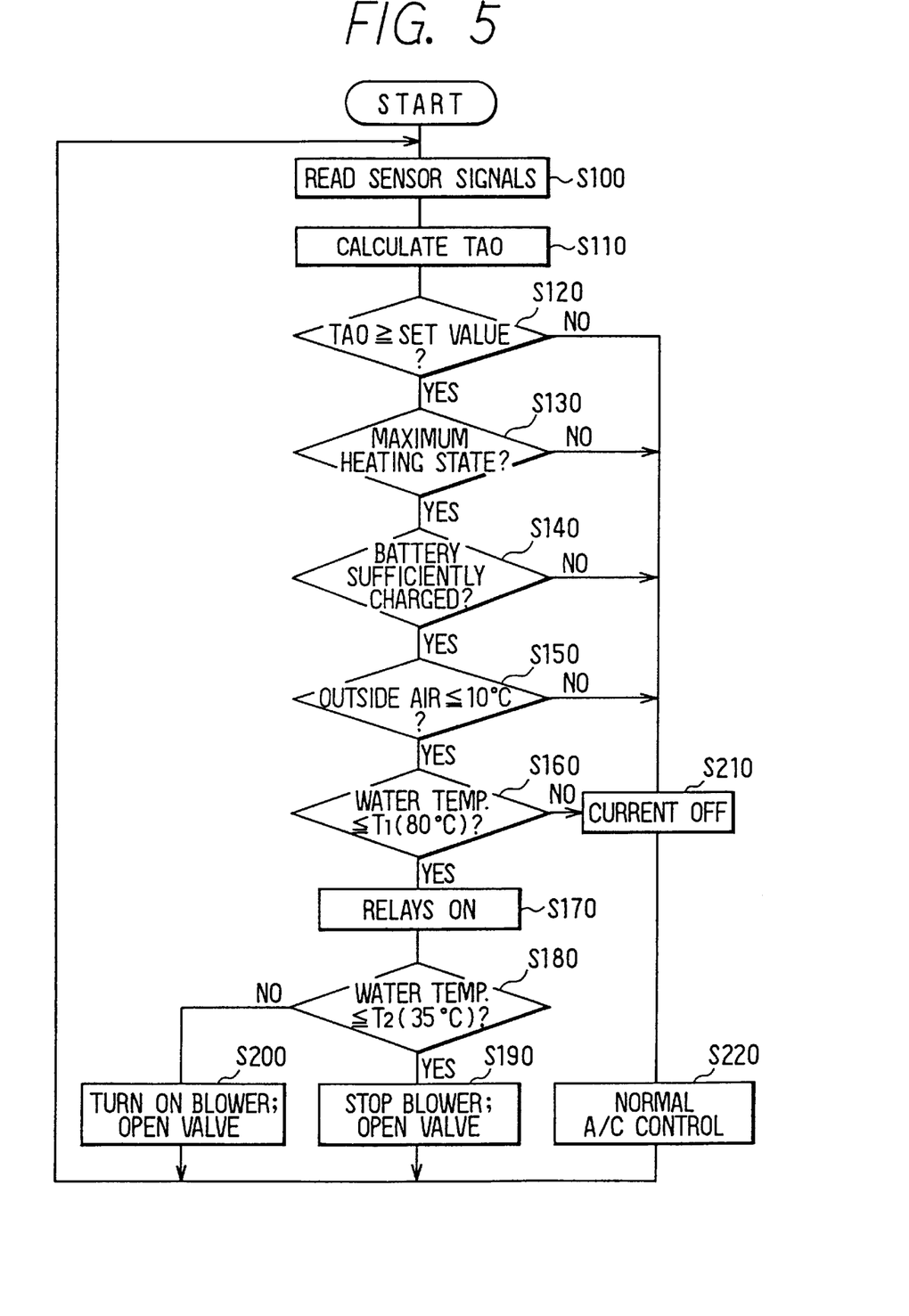
FIG. 5 is a flow diagram of electrical control in the preferred embodiment.

When the determination at step S120 of FIG. 5 is NO, the system is not in the heating operation region, and when the determination at step S130 is NO, the required heating capacity is small. In either case, processing proceeds to step S210, and the currents to the electric heating devices 15a through 15c are cut off. Also, when at step S140 it is determined that the battery is not amply charged, processing proceeds to step S210 and cuts off the currents to the electric heating devices 15a through 15c to avoid excessive discharge of the battery.

When at step S150 the outside air temperature exceeds 10 C., it is determined that the environment is not cold, and processing proceeds to step S210 and cuts off the currents to the electric heating devices 15a through 15c. Also, when the water temperature exceeds the first predetermined temperature $T_1$ (for example 80° C.), because the draft temperature to inside the passenger compartment can be amply raised with only heat released from the warm water in the warm water tubes 23, processing proceeds to step S210 and cuts off the currents to the electric heating devices 15a through 15c.

Subsequently, processing proceeds from step S210 to step S220, and normal air-conditioning control is executed. That is, in the present preferred embodiment, in correspondence with the target draft air temperature TAO calculated in the above-mentioned step S110, a mode of draft delivery to the passenger compartment, an aperture of the air mix door 42, a delivery flow of the air-conditioning blower 17, a position of the warm water valve 13 and the like are determined, and air-conditioning operation automatic control is carried out.

(Other Preferred Embodiments)

In the preferred embodiment described above, the ECU adjusts the temperature of air blown into the passenger compartment, and the air mix door 42 adjusts the flow proportions of air passing through the heat exchanger 14 and air passing through the bypass passage 43 of the heat exchanger for heating 14. However, methods wherein the draft air temperature is adjusted by adjusting the flow and the temperature of warm water circulating through the heat exchanger 14 using the warm water valve 13 are also known, and the invention can be similarly applied to such an air-conditioning system.

Also, although in the preferred embodiment described above, as flow control of the air-conditioning blower 17, the level of the voltage impressed on the blower motor 17a was varied to vary the motor speed, a pulse width modulation (PWM) method wherein the pulse width of a pulse output voltage applied to the blower motor 17a is modulated may of course alternatively be used.

Further, when integrating the electric heating devices 15a through 15c with the heat exchanger 14, the form of installation of the electric heating devices 15a through 15c is not limited to the form shown in FIG. 2 and can be changed according to the specifications of the heat exchanger 14.

While the above description constitutes the preferred embodiments of the present invention, it should be appreciated that the invention may be further modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A vehicle air-conditioning system comprising:
   a case-defining a ventilation flue;
   a heat exchanger, disposed inside the case, for heating air to be blown into a passenger compartment with warm water from a vehicle engine cooling source;
   a warm water valve for controlling a flow of warm water from the vehicle engine cooling source to the heat exchanger;

a blower for blowing air through the flue, wherein the heat exchanger has warm water tubes through which the warm water flows, radiating fins joined to the warm water tubes, and electric heating devices built into the heat exchanger to release heat to the air to be blown into a passenger compartment by way of the radiating fins; and a control unit for turning on the electric heating devices, for stopping the blower, and for opening the warm water valve so that heat from the electric heating devices is released through the radiating fins to warm water inside the warm water tubes when a predetermined heating operation region is reached and the temperature of the warm water is lower than a set temperature.

2. The system of claim 1, wherein the control unit starts the air-conditioning blower, while maintaining the electric heating devices in an on state and the warm water valve in an open state, so that heat from the electric heating devices is released through the radiating fins into the air blown by the air-conditioning blower when the temperature of the warm water rises above the set temperature.

3. The system of claim 1, wherein the control unit further calculates a target draft air temperature of air blown into the passenger compartment, to determine whether or not the heating operation region has been reached based on the target draft air temperature.

4. The system of claim 1, wherein the electric heating devices include heating device elements made of a resistive material having a positive resistance-temperature characteristic causing resistance thereof to increase rapidly at a predetermined set temperature.

5. A vehicle air-conditioning system comprising:

a case including a ventilation flue;

a heat exchanger, disposed inside the case, for heating air to be blown into a passenger compartment with water warmed by a vehicle engine;

a warm water valve for controlling a flow of warm water to the heat exchanger;

a blower for blowing air through the ventilation flue, wherein the heat exchanger includes warm water tubes through which the warm water flows, radiating fins joined to the warm water tubes, and electric heating devices built into the heat exchanger to release heat to the air to be blown into a passenger compartment via the radiating fins;

heating operation determining means for determining whether or not the system is in a heating operation region;

warm water temperature detecting means for detecting the temperature of the warm water;

warm water temperature determining means for determining whether or not the temperature of the warm water is higher than a set temperature;

first control means for turning on the electric heating devices and stopping the air-conditioning blower and opening the warm water valve when it has been determined by the determining means that the system is in a heating operation region and the temperature of the warm water is lower than the set temperature; and second control means starting the air-conditioning blower with the electric heating devices still on and the warm water valve still open when it has been determined by the determining means that the system is in a heating operation region and the temperature of the warm water is higher than the set temperature.

6. The system of claim 5, wherein the electric heating devices have heating device elements made of a resistive material having a positive resistance-temperature characteristic such that its resistance increases suddenly at a predetermined set temperature.

7. A vehicle air-conditioning system comprising:

a case including a ventilation flue;

a heat exchanger, disposed inside the case, for heating air to be blown into a passenger compartment with water warmed by a vehicle engine;

a warm water valve for controlling a flow of warm water to the heat exchanger;

a blower for blowing air through the ventilation flue, wherein the heat exchanger includes warm water tubes through which the warm water flows, radiating fins joined to the warm water tubes, and electric heating devices built into the heat exchanger to release heat to the air to be blown into a passenger compartment via the radiating fins; and calculating means for calculating a target draft air temperature of air blown into the passenger compartment, to determine whether a heating operation region is reached on the basis of the target draft air temperature.

8. The system of claim 7, wherein the electric heating devices have heating device elements made of a resistive material having a positive resistance-temperature characteristic such that its resistance increases suddenly at a predetermined set temperature.

9. A vehicle air-conditioning system comprising:

a case including a ventilation flue;

a heat exchanger, disposed inside the case, for heating air to be blown into a passenger compartment with water warmed by a vehicle engine;

a warm water valve for controlling a flow of warm water to the heat exchanger; and a blower for blowing air through the ventilation flue;

wherein the heat exchanger includes warm water tubes through which the warm water flows, radiating fins joined to the warm water tubes, and electric heating devices built into the heat exchanger to release heat to the air to be blown into a passenger compartment via the radiating fins;

wherein the air-conditioning blower is started at a minimal speed and thereafter the flow delivered by the air-conditioning blower is gradually increased as the temperature of the warm water rises when the temperature of the warm water rises above the set temperature.

10. The system of claim 9, wherein the electric heating devices have heating device elements made of a resistive material having a positive resistance-temperature characteristic such that its resistance increases suddenly at a predetermined set temperature.

* * * * *